Dec. 31, 1935.  G. BASSO  2,025,968

POWER TRANSMISSION MECHANISM

Filed Nov. 3, 1934  4 Sheets-Sheet 1

Inventor
Giovanni Basso.
By Bryant Lowry
Attorneys

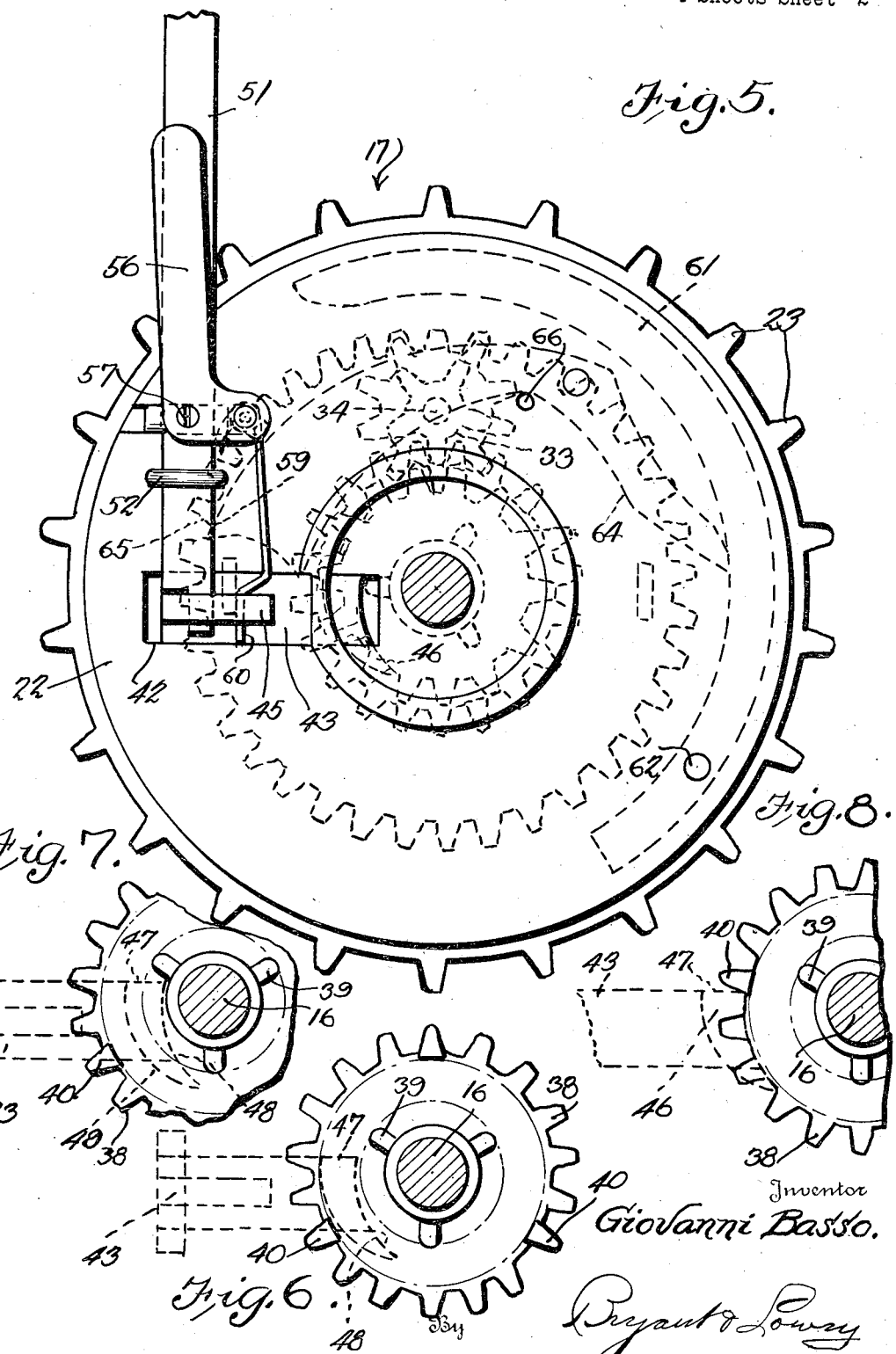

Dec. 31, 1935.  G. BASSO  2,025,968
POWER TRANSMISSION MECHANISM
Filed Nov. 3, 1934   4 Sheets-Sheet 3
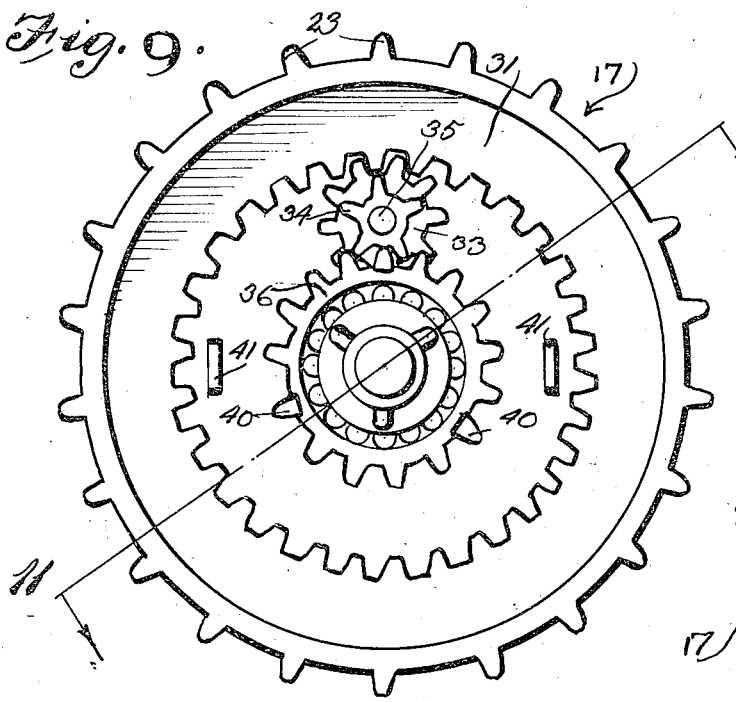
Inventor
Giovanni Basso
By Bryant H. Lowry
Attorneys Dec. 31, 1935.  G. BASSO  2,025,968

POWER TRANSMISSION MECHANISM

Filed Nov. 3, 1934  4 Sheets-Sheet 4

Inventor
Giovanni Basso.
By Bryant Lowry
Attorneys

Patented Dec. 31, 1935

2,025,968

UNITED STATES PATENT OFFICE 2,025,968

POWER TRANSMISSION MECHANISM

Giovanni Basso, English, W. Va., assignor, by direct and mesne assignments, of one-fourth to Erminio Boschian, English, one-fourth to John B. Boschian, Ethel, and one-fourth to George P. Peraldo, Welch, W. Va.

Application November 3, 1934, Serial No. 751,382

8 Claims. (Cl. 74—290)

This invention relates to certain new and useful improvements in power transmission mechanism.

The primary object of the invention is to provide a power transmission mechanism especially designed for use upon bicycles wherein a change of speed may be accomplished without increasing the speed of rotation of the pedal or crank shaft and it is to be understood that the power transmission mechanism disclosed herein may be employed in other types of vehicles, air craft and the like.

A further object of the invention is to provide power transmission mechanism of the foregoing character wherein the crank shaft of a bicycle has a direct dog and ratchet drive connection with a sprocket wheel and embodying a gear train interposed between the crank shaft and sprocket wheel adapted to be controlled in its operation for causing the sprocket wheel to travel at different increased speeds relative to the crank shaft.

It is a further object of the invention to provide power transmission mechanism for bicycles embodying a gear train interposed between the pedal crank shaft and sprocket wheel and a direct drive between the crank shaft and sprocket wheel with means for selectively restraining certain gears of the train from rotation to cause different increased speeds of the sprocket wheel relative to the crank shaft.

A still further object of the invention is to provide a brake device controlled in its operation by the crank shaft and adapted to be moved into engagement with the sprocket wheel to arrest movement thereof.

With the above and other objects in view that will become apparent as the nature of the invention is better understood, the same consists in the novel form, combination and arrangement of parts hereinafter more fully described, shown in the accompanying drawings and claimed.

In the drawings:—

Figure 5 is a side elevational view of the combined sprocket wheel and transmission mechanism housing;

Figure 6 is a plan view of the assembled second and third speed gears of the train with the crank shaft shown in section and the shoe of the speed control lever positioned intermediately of the two gears;

Figure 7 is a fragmentary plan view, similar to Figure 6, showing the shoe by dotted lines engaged with the second speed gear;

Figure 8 is a fragmentary plan view, similar to Figure 7, showing the shoe engaged with the third speed gear;

Figure 9 is a side elevational view of the sprocket wheel with the side wall thereof removed to show the gear train between the crank shaft and sprocket wheel;

Figure 10 is a fragmentary side elevational view of the sprocket wheel, similar to Figure 9, partly broken away to illustrate the direct dog and ratchet drive between the crank shaft and sprocket wheel;

Figure 11 is a cross-sectional view taken on line 11—11 of Figure 9;

Figure 12:
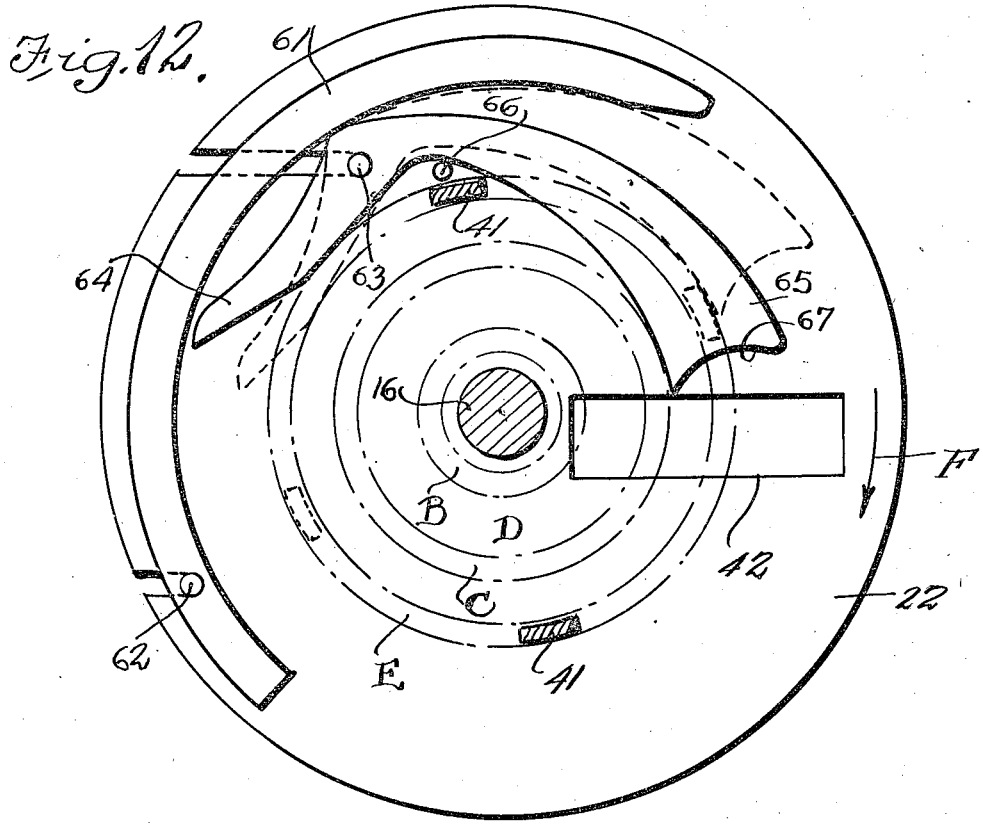
Figure 13:
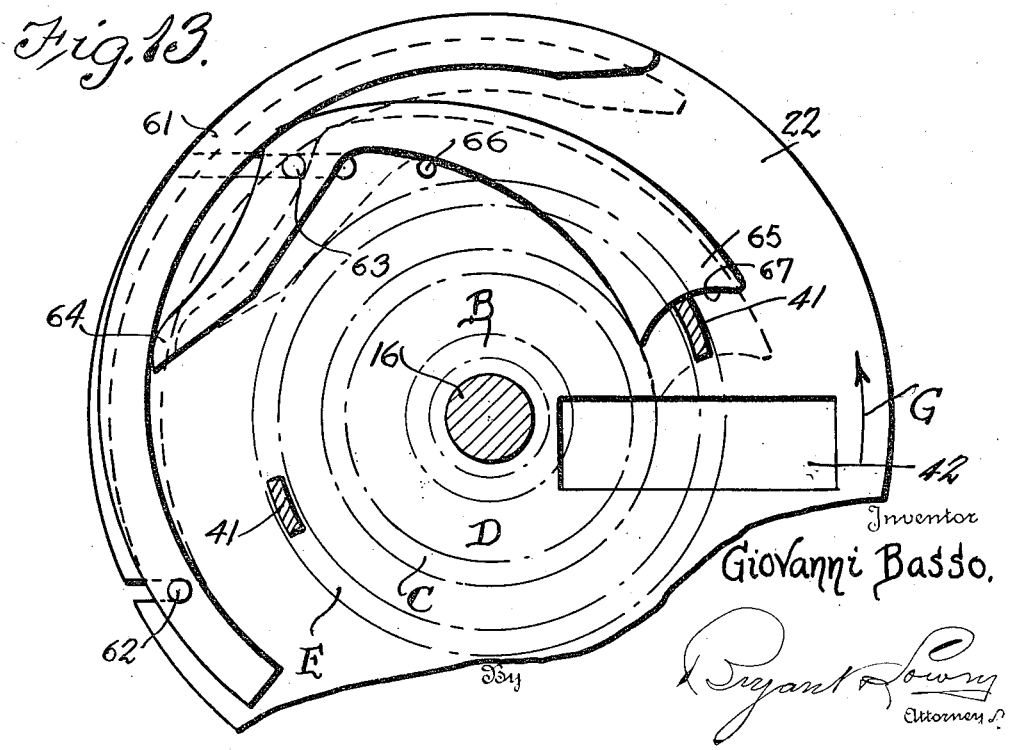

Figure 12 is an inner face view of the removable side wall of the combined sprocket wheel and transmission mechanism housing showing the brake mechanism carried thereby and in released position, the operating device for the brake being diagrammatically illustrated in section and the brake shoe operating lever shifted to dotted line position; and Figure 13 is an inner face view similar to Figure 11 showing the brake shoe in its applied position.

Figure 1:
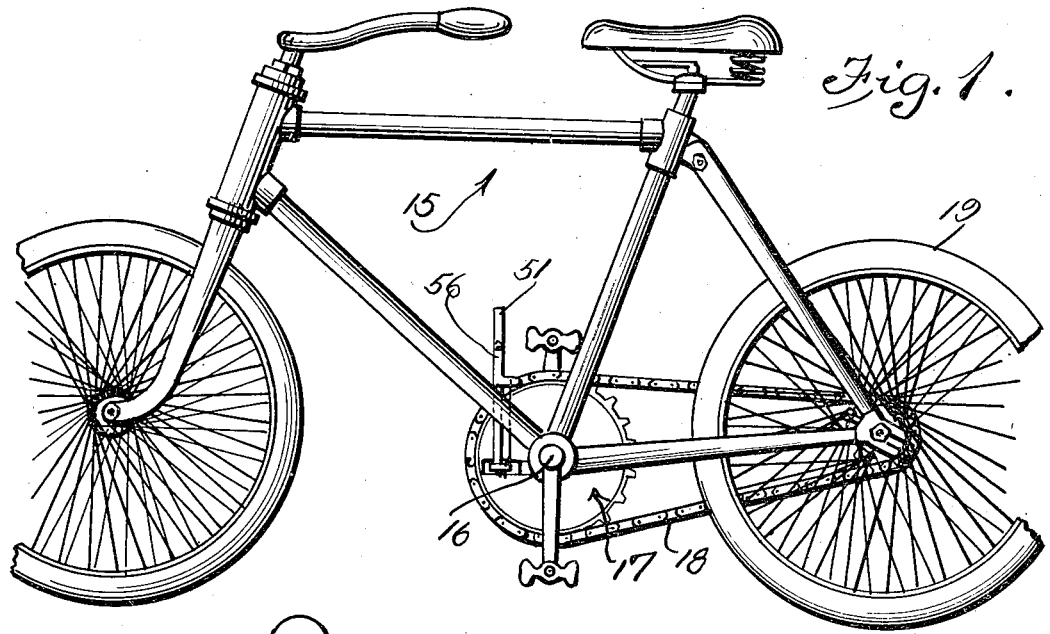
Figure 1 is a side elevational view of a bicycle equipped with the improved power transmission mechanism.
Figures 2, 3, 4:
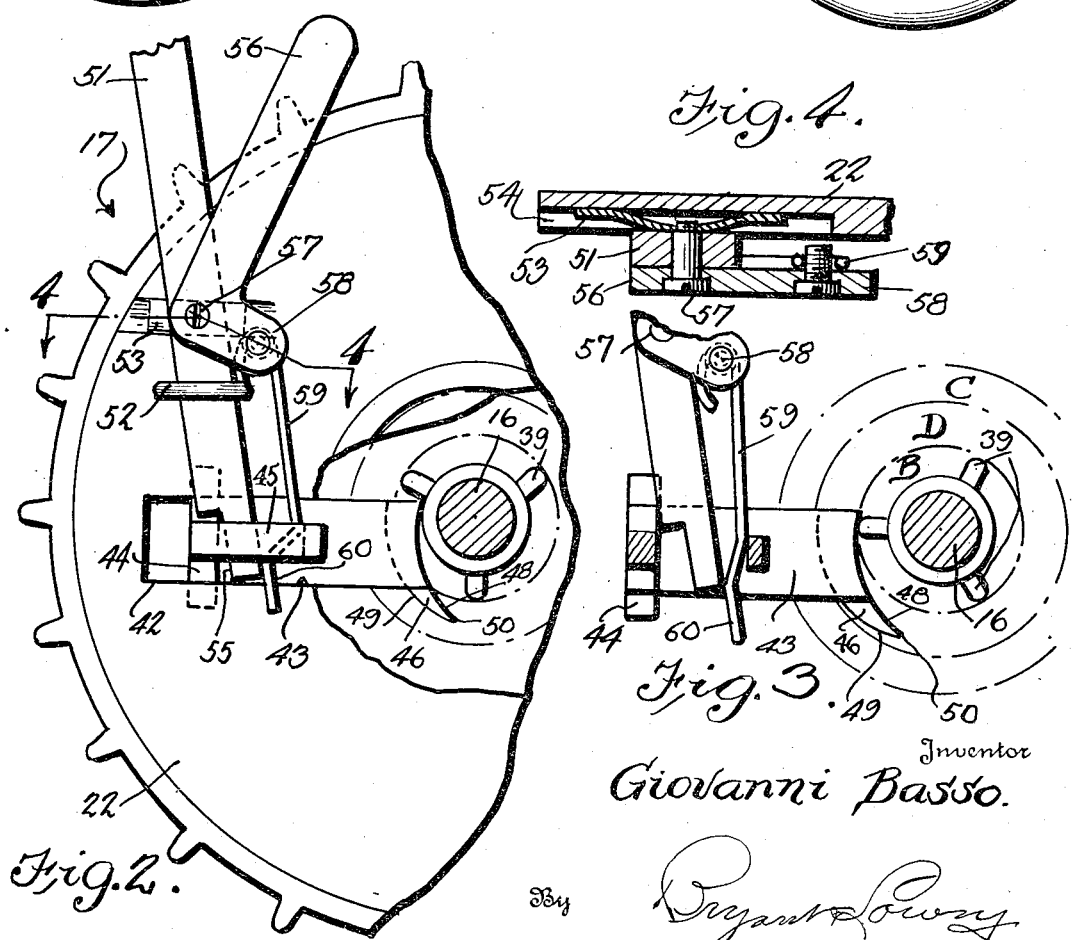
Figure 2 is an enlarged fragmentary side elevational view, partly broken away, showing the manually operable lever controlling the gears of a train and regulating the increase of the speed of the sprocket wheel relative to the crank shaft.
Figure 3 is a fragmentary sectional view, similar to Figure 2, showing the control lever of the transmission gearing in first speed position.
Figure 4 is a detail sectional view taken on line 4—4 of Figure 2, showing the spring device associated with the control lever for holding the latter in its shifted position.

While the power transmission mechanism disclosed herein may be designed for association with vehicles of the land or water type, air craft or the like, the same is herein illustrated as being applied to a bicycle and in Figure 1 of the drawings, the reference character 15 designates a bicycle provided with the usual pedal crank shaft 16 for driving the sprocket wheel 17 that has a sprocket chain connection 18 with the hub of the rear wheel 19.

Power transmission mechanism is associated with the pedal crank operated sprocket wheel 17, the latter as illustrated in several of the figures, and particularly Figure 11, being in the form of a circular casing and embodying a side wall 20 and a lateral annular wall 21 constituting a brake drum and a stationary side wall 22 closing the open side of the annular wall 21, the sprocket wheel casing being freely rotatable upon the crank shaft 16. A circular series of sprocket teeth 23 is carried by the peripheral edge of the side wall 20 of the sprocket wheel housing.

As shown in Figures 10 and 11, a relatively large ratchet disk 24 is keyed to the crank shaft 16 as at 25, being provided upon its marginal edge with ratchet teeth 26 for cooperation with a dog 27 pivotally mounted as at 28 to the inner face of the side wall 20 intermediate the peripheral edge of the ratchet disk 24 and the annular wall 21. When the crank shaft 16 and ratchet disk 24 are rotated in a propelling direction as indicated by the arrow A in Figure 10, the abutment shoulder of a ratchet tooth 26 engages the abutment end 29 of the dog 27 for rotating the sprocket wheel housing for the operation of a sprocket chain 18 to communicate rotary motion to the rear drive wheel 19 of the bicycle. When movement of the crank shaft and ratchet disk is arrested the sprocket wheel housing continues to rotate in a propelling direction with the dog 27 ratcheting over the ratchet 26 of the disk 24. The inner side 30 of the dog 27 is of such shape that when engaged by a ratchet tooth 26, the abutment shoulder 29 of the dog is positioned for engagement by a ratchet tooth when the ratchet disk 24 is again rotated in a propelling direction. The dog and ratchet connection between the crank shaft 16 and sprocket wheel 17 provides a direct drive between the shaft and sprocket wheel with these parts rotating at the same speed hereinafter referred to as first and second speeds.

A train of gearing is interposed between the crank shaft 16 and sprocket wheel 17 to cause the latter to travel at two different speeds greater than the speed of rotation of the driving shaft 16, the second increased speed preferably causing the sprocket wheel 17 to rotate one half times faster than the crank shaft 16, while the third or high speed gearing causes the sprocket wheel 17 to travel or rotate twice as fast as the crank shaft 16. The gear train as shown in Figures 5 to 10 includes an internal ring gear 31 carried by the annular wall 21 disposed laterally of the ratchet disk 24 with the teeth 32 thereof overlying the marginal edge of the ratchet disk. A one-piece double pinion structure comprising a base pinion 33 and a smaller superposed pinion 34 is carried by a stub shaft 35 that is rotatably mounted in a bearing opening adjacent the marginal edge of the ratchet disk 24 to position the teeth of the pinion 33 for engagement with the teeth 32 of the internal ring gear 31. A gear wheel 36 has a central hub portion 37 freely rotatable upon the crank shaft 16 and has meshing engagement with the pinion 33. A gear 38 is freely rotatable upon the hub 37 of the gear 36 and the teeth thereof are positioned for engagement with the smaller pinion 34. Anti-friction bearings are interposed between the gear wheels as illustrated in Figures 9 to 11 and the parts are retained in assembled relation between the side walls 20 and 22 of the sprocket wheel housing. For purposes presently to appear, a series of equi-distantly spaced lugs 39 and 40 respectively rise from the hub 37 of the gear 36 and the marginal edge of the ring gear 38, being in the same plane and in concentric paths. A pair of diametrically opposite lugs 41 rise from the ratchet disk 24 and form a part of the brake mechanism to be later described.

The unitary pinion structure comprising the pinions 33 and 34 and the gears 36 and 38 are freely mounted and when either of the gears 36 or 38 are restrained from rotary movement the double pinion structure is caused to rotate at different speeds for imparting different increased speeds of rotation to the sprocket wheel 17. The meshing gears and pinions are proportioned so that when the gear 36 is restrained from rotary movement, the pinion 33 is operative in connection with the internal ring gear 31 for causing the sprocket wheel 17 to rotate one half times faster than the crank shaft 16 and when the gear 38 is restrained from rotary movement, the smaller pinion 34 is effective for rotating the pinion 33 at increased speeds which is imparted to the internal ring gear 31 and sprocket wheel 17 for causing the latter to rotate twice as fast as the crank shaft 16.

The mechanism for controlling operation of the gears 36 and 38 is shown more clearly in Figures 2 to 8, the side wall 22 of the sprocket wheel housing that is stationary having a horizontal radially slotted opening 42. A bar 43 is slidably mounted in the opening 42 and is retained in position therein by means of a cross cleat 44 carried by the outer end of the bar at the inner side of the wall 22 that extends over the opposite sides of the slotted opening 42 while an apertured block 45 is carried by the outer face of the bar 43 at the outer end thereof to receive one end of a shifting lever carried by the outer face of the side wall 22. This arrangement of elements retains the bar 43 in the slotted opening 42. A clutch shoe 46 of semi-crescent formation is carried by the inner end of the bar 43 at the inner side thereof and includes an end abutment shoulder 47 and inner and outer curved faces 48 and 49 respectively that merge into a pointed end 50. The paths in which the lugs 39 and 40 travel are diagrammatically illustrated in Figure 12, the lugs 39 travelling in the path B while the lugs 40 travel in the path C, the intermediate zone D being occupied by the clutch shoe 46 when the gears 36 and 38 are inactive and the drive is directly between the crank shaft 16 and sprocket wheel 17. When the clutch shoe 46 is in the zone D, the same is spaced from the path of movement of the lugs 39 and 40 in the zones B and D and when the crank shaft 16 is rotated by the pedals of the bicycle, the ratchet disk 24 fits to the crank shaft and engages the dog 27 as shown in Figure 10 for the rotation of the sprocket wheel. Disposition of the clutch shoe is shown in Figure 6. When the clutch shoe occupies the dotted line position as shown in Figure 7, the same is moved into the zone B to have the abutment shoulder 47 thereof positioned for engagement with a lug 39 of the gear 36 to arrest movement of said gear and when so disposed, rotation of the crank shaft 16 rotates the ratchet disk 24 and the double pinion constructions 33 and 34 carried thereby, the larger pinion 33 meshing with the gear 36, the pinion 33 also meshing with the internal ring gear 31 and causing the latter to travel at a speed one half times faster than the crank shaft and ratchet disk. When the clutch shoe 46 is moved outwardly into the path or zone C, the abutment shoulder 47 thereof is engaged with a lug 40 upon the gear 38, the latter being then arrested from movement while the smaller pinion 34 meshing therewith causes the larger pinion 33 to rotate at an increased rate of speed for imparting such increased movement to the internal ring gear 31 and the sprocket wheel 17, these gears being proportioned to cause the sprocket wheel to rotate twice as fast as the crank shaft and ratchet disk. The clutch shoe 46 is automatically shifted into the first speed zone D from engagement with the second or third speed gears when rotation of the crank shaft is arrested and the sprocket wheel continues to rotate, it being noted from an inspection of Figure 7 which shows the clutch shoe engaged with a lug of the second speed gear that an adjacent lug 39 of the second speed gear will move into engagement with the inner curved sides 48 of the clutch shoe for shifting the same into the first speed zone D, and when the clutch shoe is engaged with a lug 40 of the third speed gear 38, the adjacent lug 40 will move into engagement with the outer curved side 49 of the clutch shoe for shifting the same inwardly into the first speed zone D.

The manually operable means for shifting the bar 43 carrying the clutch shoe 46 is shown more clearly in Figures 2 to 5, a lever 51 being pivotally mounted by means of a strap 52 with the outer side of the side wall 22 of the sprocket wheel housing with the lower end thereof extending into the apertured block 45 of the bar 43. The lever 51 may be of a length to be either hand or foot operated. A spring strap 53 is carried by the lever 51 above the pivot 52 and rides in a groove 54, the parallel side walls of which retain the spring therein and prevent upward shifting movement of the lever 51, this spring strap 53 acting to hold the lever 51 in shifted position, except when automatically moved by the lugs of the gears shifting the clutch shoe 46. The lower end of the lever 51 is cut away as at 55 to permit movement of the bar 43 independently of the lever. A bell crank arm 56 is pivotally mounted upon the lever 51 as at 57 and the lower angular short leg 58 thereof carries a spring arm 59 having an offset portion 60 at its lower end that extends through the opening in the apertured block 45. When the bell crank arm 56 is shifted to the position shown in Figure 2, the spring arm 59 moves downwardly through the opening in the apertured block 45 to prevent movement of the block and bar 43 relative to the lever 51 so that manual operation of the lever 51 is required for shifting the clutch shoe 46 from the zone D into the path B for engagement with a lug 39 of the gear 36. When the spring arm 59 is in the position shown in Figure 5, the bar 43 may be moved relative to the lower reduced end of the lever 51 and when the lever 51 is manually shifted to position the clutch shoe for engagement with the lug 39 of the second speed gear 36, the bar 43 and clutch shoe 46 may be automatically disengaged from the second speed gear with the lever 51 remaining in second speed position and when power is again applied to the crank shaft 16, the bar 43 and clutch shoe 46 automatically move to second gear position so that it is unnecessary to manually shift the lever 51 and start the driving connections in low or first gear.

A brake device is associated with the sprocket wheel housing and as shown in Figures 12 and 13, is mounted upon the inner side of the stationary side wall 22 and includes a curved brake shoe 61 having a pin and slot connection 62 adjacent one end of the wall 22 and a bell crank operating lever for the brake shoe pivoted by means of a pin and slot connection 63 upon the side wall 22 inwardly of the brake shoe 61 and having end legs 64 and 65, the latter being overbalanced and limited in movement by the pin 66 disposed adjacent the pivot 63. Lugs 41 carried by the ratchet disk 24 as shown in Figure 10 travel in circular paths E as shown in Figures 12 and 13, each lug 41 successively engaging the legs 64 and 65 of the brake shoe operating lever as shown in Figure 12, and positioning the curved end 67 of the leg 65 in the lug path E, the lugs travelling in the path indicated by the arrow F in Figure 12. When the brake shoe 61 is to be applied or moved into engagement with the inner side of the annular wall 21 that constitutes the brake drum, the crank shaft 16 is reversely rotated to cause the lugs 41 to rotate in the direction of the arrow G in Figure 13, one of the lugs engaging the curved end 67 of the leg 65 of the brake shoe operating lever for shifting the lever to the full line position shown in Figure 13 to bring the brake shoe into engagement with the brake drum.

From the above detailed description of the invention, it is believed that the construction and operation thereof will at once be apparent and while there is herein shown and described the preferred embodiment of the invention, it is nevertheless to be understood that minor changes may be made therein without departing from the spirit and scope of the invention as claimed.

I claim:—

1. In power transmission mechanism, a crank shaft, a sprocket wheel journalled thereon, a direct dog and ratchet drive between the crank shaft and sprocket wheel, an internal gear on the sprocket wheel and change speed gearing interposed between the crank shaft and internal gear including a double pinion structure rotatable on the ratchet drive with one of the pinions meshing with the internal gear, a pair of gears rotatable on the crank shaft respectively meshing with the pinions, the respective sets of gears and pinions being proportioned to effect different increased speeds of rotation of the internal gear and sprocket wheel relative to the crank shaft, and means for holding either gear against rotation to render the selected pinion drive effective.

2. In power transmission mechanism, a crank shaft, a sprocket wheel journalled thereon, a direct dog and ratchet drive between the crank shaft and sprocket wheel, an internal gear on the sprocket wheel and change speed gearing interposed between the crank shaft and internal gear including a double pinion structure rotatable on the ratchet drive with one of the pinions meshing with the internal gear, a pair of gears rotatable on the crank shaft respectively meshing with the pinions, the respective sets of gears and pinions being proportioned to effect different increased speeds of rotation of the internal gear and sprocket wheel relative to the crank shaft, abutment lugs on each gear and a manually operable clutch shoe adapted to be selectively moved into engagement with either set of abutment lugs for holding either gear against rotation to render the selected pinion drive effective.

3. In power transmission mechanism, a crank shaft, a sprocket wheel journalled thereon, a direct dog and ratchet drive between the crank shaft and sprocket wheel, an internal gear on the sprocket wheel and change speed gearing interposed between the crank shaft and internal gear including a double pinion structure rotatable on the ratchet drive with one of the pinions meshing with the internal gear, a pair of gears rotatable on the crank shaft respectively meshing with the pinions, the respective sets of gears and pinions being proportioned to effect different increased speeds of rotation of the internal gear and sprocket wheel relative to the crank shaft, abutment lugs on each gear and a manually operable clutch shoe adapted to be selectively moved into engagement with either set of abutment lugs for holding either gear against rotation to render the selected pinion drive effective, the clutch shoe being of substantially crescent-shape and having an end abutment shoe for selective engagement with the lugs and an arcuate end adapted to be engaged by the lugs for displacing the clutch shoe relative to the lugs when the crank shaft is at rest and the sprocket wheel is rotating.

4. In power transmission mechanism, a crank shaft, a sprocket wheel journalled thereon, a direct dog and ratchet drive between the crank shaft and sprocket wheel, an internal gear on the sprocket wheel and change speed gearing interposed between the crank shaft and internal gear including a double pinion structure rotatable on the ratchet drive with one of the pinions meshing with the internal gear, a pair of gears rotatable on the crank shaft respectively meshing with the pinions, the respective sets of gears and pinions being proportioned to effect different increased speeds of rotation of the internal gear and sprocket wheel relative to the crank shaft, abutment lugs on each gear and a manually operable clutch shoe adapted to be selectively moved into engagement with either set of abutment lugs for holding either gear against rotation to render the selected pinion drive effective, the sprocket wheel comprising a housing for the gearing, a stationary side wall for the housing, a brake shoe supported on the side wall and means carried by the ratchet drive for moving the brake shoe into engagement with the housing for braking the sprocket wheel, the clutch shoe being of substantially crescent-shape and having an end abutment shoe for selective engagement with the lugs and an arcuate end adapted to be engaged by the lugs for displacing the clutch shoe relative to the lugs when the crank shaft is at rest and the sprocket wheel is rotating.

5. In power transmission mechanism, a crank shaft, a sprocket wheel journalled thereon, a direct dog and ratchet drive between the crank shaft and sprocket wheel, an internal gear on the sprocket wheel and change speed gearing interposed between the crank shaft and internal gear including a double pinion structure rotatable on the ratchet drive with one of the pinions meshing with the internal gear, a pair of gears rotatable on the crank shaft respectively meshing with the pinions, the respective sets of gears and pinions being proportioned to effect different increased speeds of rotation of the internal gear and sprocket wheel relative to the crank shaft, abutment lugs on each gear and a manually operable clutch shoe adapted to be selectively moved into engagement with either set of abutment lugs for holding either gear against rotation to render the selected pinion drive effective, the sprocket wheel comprising a housing for the gearing, a stationary side wall for the housing, a bar slidable on the side wall and carrying the shoe and a lever pivoted on the side wall and engaged with the bar for manual operation thereof.

6. In power transmission mechanism, a crank shaft, a sprocket wheel journalled thereon, a direct dog and ratchet drive between the crank shaft and sprocket wheel, an internal gear on the sprocket wheel and change speed gearing interposed between the crank shaft and internal gear including a double pinion structure rotatable on the ratchet drive with one of the pinions meshing with the internal gear, a pair of gears rotatable on the crank shaft respectively meshing with the pinions, the respective sets of gears and pinions being proportioned to effect different increased speeds of rotation of the internal gear and sprocket wheel relative to the crank shaft, abutment lugs on each gear and a manually operable clutch shoe adapted to be selectively moved into engagement with either set of abutment lugs for holding either gear against rotation to render the selected pinion drive effective, the sprocket wheel comprising a housing for the gearing, a stationary side wall for the housing, a bar slidable on the side wall and carrying the shoe and a lever pivoted on the side wall and engaged with the bar for manual operation thereof, a loose connection between the lever and bar and a spring device associated with the bar and lever for normally moving the clutch shoe in a direction for engagement with one set of lugs.

7. In power transmission mechanism, a crank shaft, a sprocket wheel journalled thereon, a direct dog and ratchet drive between the crank shaft and sprocket wheel, an internal gear on the sprocket wheel and change speed gearing interposed between the crank shaft and internal gear including a double pinion structure rotatable on the ratchet drive with one of the pinions meshing with the internal gear, a pair of gears rotatable on the crank shaft respectively meshing with the pinion, the respective sets of gears and pinions being proportioned to effect different increased speeds of rotation of the internal gear and sprocket wheel relative to the crank shaft, abutment lugs on each gear and a manually operable clutch shoe adapted to be selectively moved into engagement with either set of abutment lugs for holding either gear against rotation to render the selected pinion drive effective, the abutment lugs of the respective gears being arranged in concentric series and the clutch shoe normally travelling in a path intermediate the concentric series of lugs and reciprocable in opposite directions for engagement with the lugs.

8. In power transmission mechanism, a crank shaft, a sprocket wheel journalled thereon, a direct dog and ratchet drive between the crank shaft and sprocket wheel, an internal gear on the sprocket wheel and change speed gearing interposed between the crank shaft and internal gear including a double pinion structure rotatable on the ratchet drive with one of the pinions meshing with the internal gear, a pair of gears rotatable on the crank shaft, respectively meshing with the pinion, the respective sets of gears and pinions being proportioned to effect different increased speeds of rotation of the internal gear and sprocket wheel relative to the crank shaft, abutment lugs on each gear and a manually operable clutch shoe adapted to be selectively moved into engagement with either set of abutment lugs for holding either gear against rotation to render the selected pinion drive effective, the abutment lugs of the respective gears being arranged in concentric series and the clutch shoe normally travelling in a path intermediate the concentric series of lugs and reciprocable in opposite directions for engagement with the lugs, and said lugs and clutch shoe being cooperatively constructed whereby the lugs automatically shift the clutch shoe into the intermediate path when the crank shaft is at rest and the sprocket wheel is rotating.

GIOVANNI BASSO.